United States Patent [19]

McMullin

[11] Patent Number: 5,083,438

[45] Date of Patent: Jan. 28, 1992

[54] CHILLER MONITORING SYSTEM

[76] Inventor: Larry D. McMullin, 807 Arlington Rd., Park Hills, Ky. 41001

[21] Appl. No.: 662,596

[22] Filed: Mar. 1, 1991

[51] Int. Cl.$^5$ ............................................. G01K 13/00
[52] U.S. Cl. ...................................... 62/129; 62/127; 364/551.01; 374/40; 165/11.1
[58] Field of Search ................. 62/129, 126, 125, 127; 236/94; 165/11.1; 374/39, 40, 41; 364/551.01, 557; 73/112

[56] References Cited

U.S. PATENT DOCUMENTS

| | | | |
|---|---|---|---|
| 4,161,106 | 7/1979 | Savage et al. | 62/115 |
| 4,325,223 | 4/1982 | Cantley | 62/126 |
| 4,328,682 | 5/1982 | Vana | 62/129 X |
| 4,510,576 | 4/1985 | MacArthur et al. | 364/551 |
| 4,581,900 | 4/1986 | Lowe et al. | 62/228.1 |
| 4,611,470 | 9/1986 | Enström | 62/129 X |
| 4,660,386 | 4/1987 | Hansen et al. | 62/126 |
| 4,677,830 | 7/1987 | Smikawa et al. | 62/126 |
| 4,768,346 | 9/1988 | Mathur | 62/127 |
| 4,885,914 | 12/1989 | Pearman | 62/129 |

FOREIGN PATENT DOCUMENTS 2068128 8/1981 United Kingdom .................. 374/41

OTHER PUBLICATIONS

HVC Daly, "Find Out How Much Extra You're Going to Pay to Keep Cool This Summer", (Company Brochure), May 22, 1989.

HVC Daly, "Keep Down the Cost of Keeping Cool", (Company Brochure), May 22, 1989.

*Primary Examiner*—Harry B. Tanner
*Attorney, Agent, or Firm*—Sughrue, Mion, Zinn, Macpeak & Seas

[57] ABSTRACT

A method and apparatus for measuring and monitoring critical parameters of a chiller, such as the chiller efficiency. Specifically, temperature and pressure sensors are disposed in the inlet and outlet lines of a condenser and chiller unit. A sensor is also placed on the compressor motor for determining the amount of power being expended by the motor. The actual flow rate of the chilled water entering and leaving the chiller unit is calculated based upon the sensor inputs. The actual kilowatts per unit ton rating for the evaporator is determined. The design kilowatts per unit ton rating for the evaporator is corrected to take into account any variation between the actual motor voltage and design motor voltage, and the total temperature deviation. The chiller efficiency is then calculated based on these two kilowatt per ton ratings.

11 Claims, 2 Drawing Sheets

CHILLER MONITORING SYSTEM

BACKGROUND OF THE INVENTION

The present invention relates to the monitoring of a cooling system and, in particular, relates to an apparatus and method for measuring and monitoring critical parameters of a chiller unit in real-time.

For a cooling system to operate smoothly and cost-effectively, it must run efficiently. There are many factors, however, that can affect the cooling system's efficiency. For example, an overburdened cooling system may be the result of scale build-up, fouling, corrosion, or impeded heat transfer or machine operation stemming from improper flow rates or refrigerant charge.

There have been apparatus and methods proposed which analyze some aspects of a cooling system's operation. For example, U.S. Pat. No. 4,768,346 issued to Mathur discloses a method for calculating the coefficient of performance (COP) of a vapor compression type refrigeration system. Specifically, COP algorithms, which are a set of parametric algebraic equations, use a set of measurements to determine whether performance degradation (fault) exists in a chiller. The set of measurements consists of sensing the temperature of the condenser cooling water supply, the temperature of the supply and return lines of the evaporator, and measuring the power supplied by a motor.

The Mathur method is disadvantageous, however, in that the chilled water flow rate is assumed to be constant. This assumption is completely unreliable because there are many factors, such as a clogged strainer, automated control cycling, lowered system demand, or a partially closed valve that can directly affect the flow of the chilled water, thereby rendering the flow rate anything but a constant. Such factors bear directly on the chiller tonnage calculation which is directly related to the chilled water flow rate. Thus, the chiller efficiency, which is a ratio of the design and actual chiller tonnage, cannot be accurately computed.

U.S. Pat. No. 4,161,106 issued to Savage et al. discloses a method and apparatus for determining whether a refrigeration unit (i.e., chiller) is operating efficiently. A correlation is drawn between the refrigeration unit condition and condenser head pressure. That is, the condenser head pressure is compared with an ideal condenser head pressure obtained as a function of load on the compressor motor and either condenser cooling fluid inlet or outlet temperature.

The approach of Savage et al. is also disadvantageous in that it does not compute the actual rate of flow of the chilled water. Rather, the flow rate is indirectly calculated by measuring the compressor motor load and assuming that the flow rate is a certain function thereof. Further, Savage et al. does not disclose a means of providing the operator with a report of the critical parameters, making it difficult for the operator to evaluate the chiller's performance.

SUMMARY OF THE INVENTION

Accordingly, it is a general object of the present invention to provide a method and apparatus for measuring and monitoring the chiller efficiency along with other critical parameters which are free of the above-mentioned problems and disadvantages.

It is a more specific object of the present invention to provide a monitoring apparatus for use with a refrigeration-/cooling system having a compressor, condenser, chiller (also referred to as an evaporator or cooler) and an electric motor, wherein temperature sensors and pressure sensors are disposed at the inlets and outlets of the condenser and chiller, load sensors are disposed at the output of the motor and a data processor calculates at least the operating efficiency of the chiller in accordance with the sensed outputs and predetermined constant data.

It is another object of the present invention to display or generate a hard copy report of the critical parameters of the chiller to provide to the operator information to enable him or her to make an evaluation of the chiller's efficiency and overall performance.

It is another object of the present invention to determine the actual flow rate of the chilled water.

The above and other objects of the invention are accomplished by an apparatus for measuring and monitoring critical parameters including an operating efficiency of a chiller unit of the type having a compressor, a condenser, an evaporator, and a motor for driving the compressor, the condenser having an inlet line for receiving a supply of condenser water and an outlet line for discharging the supply of condenser water, the evaporator having an inlet line for receiving a supply of chilled water and an outlet line for discharging the supply of chilled water, wherein the apparatus consists of: first and second temperature sensors respectively disposed at the inlet and the outlet of the condenser for detecting and outputting condenser water entering and leaving temperatures; third and fourth temperature sensors respectively disposed at the inlet and outlet of the evaporator for detecting and outputting chilled water entering and leaving temperatures; first and second pressure sensors respectively disposed at the inlet and outlet of the condenser for detecting and outputting condenser water entering and leaving pressures; third and fourth pressure sensors respectively disposed at the inlet and outlet of the evaporator for detecting and outputting chilled water entering and leaving pressures; load sensor means for detecting and outputting a load of the motor; storage means for storing predetermined constant data; data processing means receiving the outputs of the first, second, third and fourth temperature sensors, the first, second, third and fourth pressure sensors, and the load sensor means for calculating at least the efficiency of the chiller in accordance with the outputs of the first, second, third and fourth temperature sensors, the first, second, third and fourth pressure sensors, and the load sensor means and the predetermined constant data; and display means for displaying the chiller operating efficiency, the condenser water entering and leaving temperatures, the chilled water entering and leaving temperatures, the condenser water entering and leaving pressures, the chilled water entering and leaving pressures, and compressor motor amperes.

The above and other objects of the invention are also accomplished by a method for measuring and monitoring at least an operating efficiency of a chiller unit of the type having a compressor, a condenser, an evaporator, a motor for driving the compressor, the condenser having an inlet line for receiving a supply of condenser water and an outlet line for discharging the supply of condenser water, the evaporator having an inlet line for receiving a supply of chilled water and an outlet line for discharging the supply of chilled water, which includes the steps of: (a) sensing pressures of the chilled water entering and leaving the evaporator and determining a pressure difference; (b) calculating an actual flow rate of the chilled water in accordance with the pressure difference and predetermined constant data; (c) sensing temperatures of the chilled water entering and leaving the evaporator and determining a temperature difference; (d) sensing a load of the motor; (e) calculating the efficiency of the chiller in accordance with the actual flow rate, the temperature difference, the load and the predetermined constant data; (f) displaying the chiller efficiency result; and (g) repeating steps (a)–(f).

The above and other objects of the invention are further accomplished by a method for measuring and monitoring an operating efficiency of a chiller unit of the type having a compressor, a condenser, an evaporator, a motor for driving the compressor, the condenser having an inlet line for receiving a supply of condenser water and an outlet line for discharging the supply of condenser water, the evaporator having an inlet line for receiving a supply of chilled water and an outlet line for discharging the supply of chilled water, including the steps of: (a) sensing pressures of the supply of chilled water entering and leaving the evaporator and determining an evaporator pressure difference; (b) calculating an actual chilled water flow rate in accordance with the pressure difference and predetermined constant data; (c) sensing temperatures of the supply of chilled water entering and leaving the evaporator and determining an evaporator temperature difference; (d) sensing a load of the motor; (e) calculating an actual kilowatt usage per evaporator ton in accordance with the actual chilled water flow rate, the evaporator temperature difference, the load and predetermined constant data; (f) sensing temperatures of the supply of condenser water entering and leaving the condenser and determining a condenser temperature difference; (g) calculating a corrected design kilowatt usage per evaporator ton in accordance with the evaporator temperature difference, and the condenser temperature difference, the load the predetermined constant data; (h) calculating the operating efficiency of the chiller by dividing the corrected design kilowatt usage per evaporator ton by the actual kilowatt usage per evaporator ton; (i) displaying the chiller operating efficiency; and repeating steps (a)–(i).

The above and other objects, features and advantages of the present invention will become more apparent from the following detailed description taken in conjunction with the accompanying drawings.

DESCRIPTION OF THE PREFERRED EMBODIMENT

Figure 1:
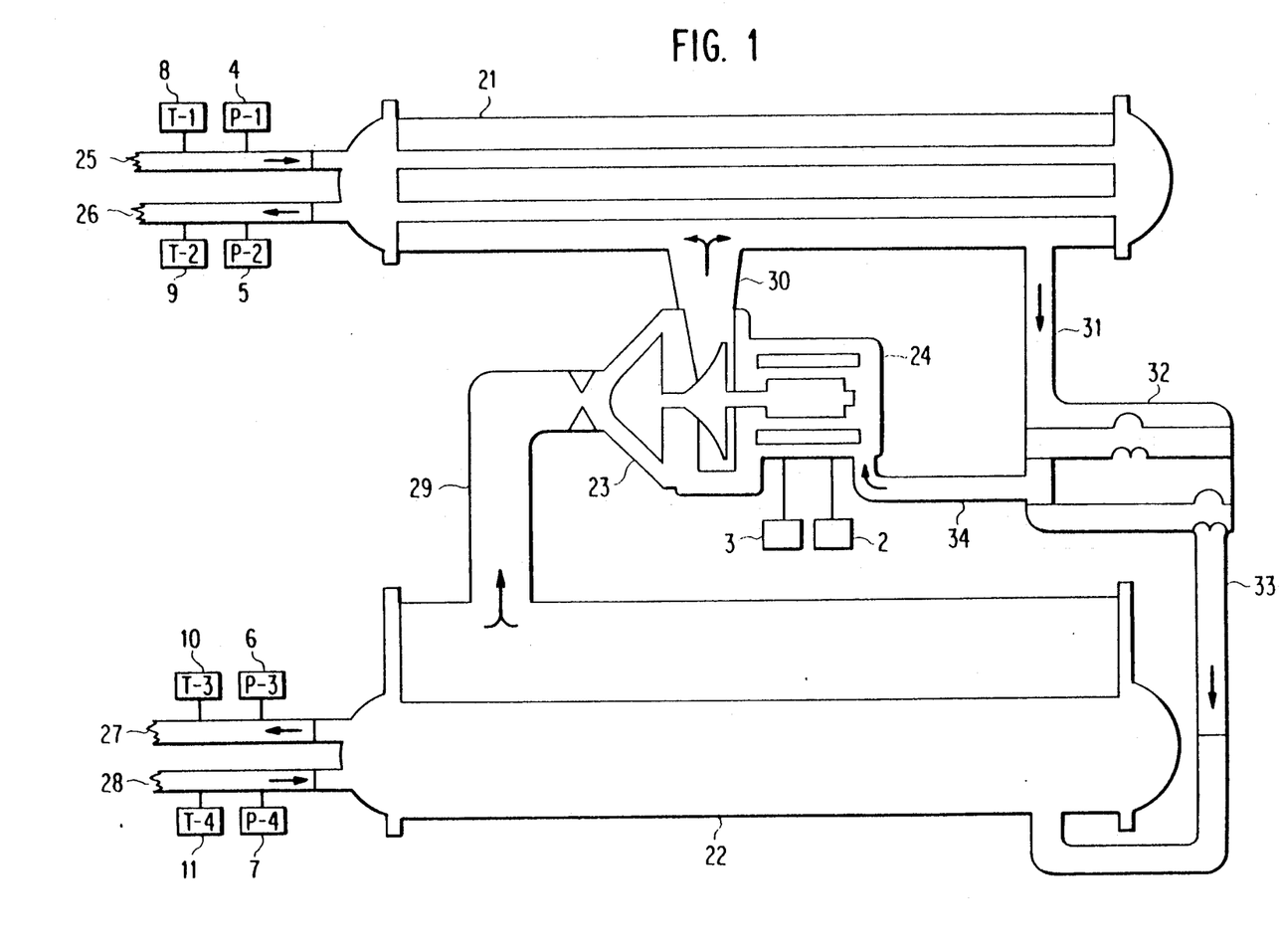
FIG. 1 shows a diagram of a centrifugal chiller unit.

With reference to FIG. a centrifugal chiller of a refrigeration/cooling system is illustrated. The refrigeration/cooling system is composed of a centrifugal compressor 23 plus condenser 21, a chiller 22 (also referred to as either a cooler or evaporator), and a three-phase compressor motor 24, which are assembled to operate as an integral unit. A line 29 connects the chiller 22 to the compressor 23 for passing vaporized refrigerant from the chiller 22 to the compressor 23, where the vapor is then compressed and discharged to the condenser 21 via line 30. The refrigerant, after being compressed and condensed to a liquid form, is discharged from the condenser 21 via a return line 31 and a liquid receiver 32 back to the chiller 22 via line 33. The refrigerant in the liquid receiver 32 is also circulated to the surroundings of the compressor motor 24 via line 34 in order to cool the motor.

The chiller 22, for example, may be of the semi-flooded type having bottom rows of tubes (not shown) submerged in refrigerant. A chilling liquid, such as water, to be chilled is pumped into the chiller 22 via an inlet line 28 through the tubes and discharged from the chiller 22 via an outlet line 27. As the chilled water flows through the tubes, heat transfers from the chilled water to the liquid refrigerant, causing the refrigerant to boil and vaporize and pass to the compressor 23 through line 29. The heat transfer further causes the temperature of the chilling liquid flowing out of the chiller 22 to be lower than the temperature of the chilling liquid flowing into the chiller 22.

The centrifugal compressor 23 has a rotating impeller (not shown) that imparts a high velocity to the refrigerant vapor and thus increases its kinetic energy. This energy is then converted to static pressure in the expanding section of the impeller housing and thereby develops the head necessary for the refrigeration cycle. This causes the vapor drawn from the chiller 22 to be compressed and discharged into the condenser 21. Although the compressor 23 may be driven by many different sources, such as a steam turbine, a gas engine or a gas turbine, an electric motor 24 is used as the driving source in this embodiment.

The condenser 21, which may be a shell-and-tube heat exchanger type, is a heat transfer vessel which condenses the compressed refrigerant vapor, usually in the shell, received from the compressor 23. The heat of the condensation is rejected to condensing water which enters the condenser 21 through line 25, circulates through the tubes contained in the shell (not shown), and exits the condenser via line 26 carrying away the rejected heat. The condensed vapor inside the shell is collected as a liquid and then fed to the liquid receiver 32.

In accordance with the present invention, two temperature sensors 4 and 5 and two pressure sensors 8 and 9 are disposed on the inlet and outlet lines 25 and 26 of the condenser 21 for continuously monitoring the temperature and pressure of the condenser water flowing in and out of the condenser 21. Similarly, two temperature sensors 6 and 7 and two pressure sensors 10 and 11 are disposed on the inlet and outlet lines 27 and 28 of the chiller 22 for continuously monitoring the temperature and pressure of the chilled water flowing in and out of the chiller 22. Finally, load sensors 2 and 3, such as amp meters, are connected to the compressor motor 24 for sensing the load (in terms of amperes) of the compressor 23 on two of the three phases.

Figure 2:
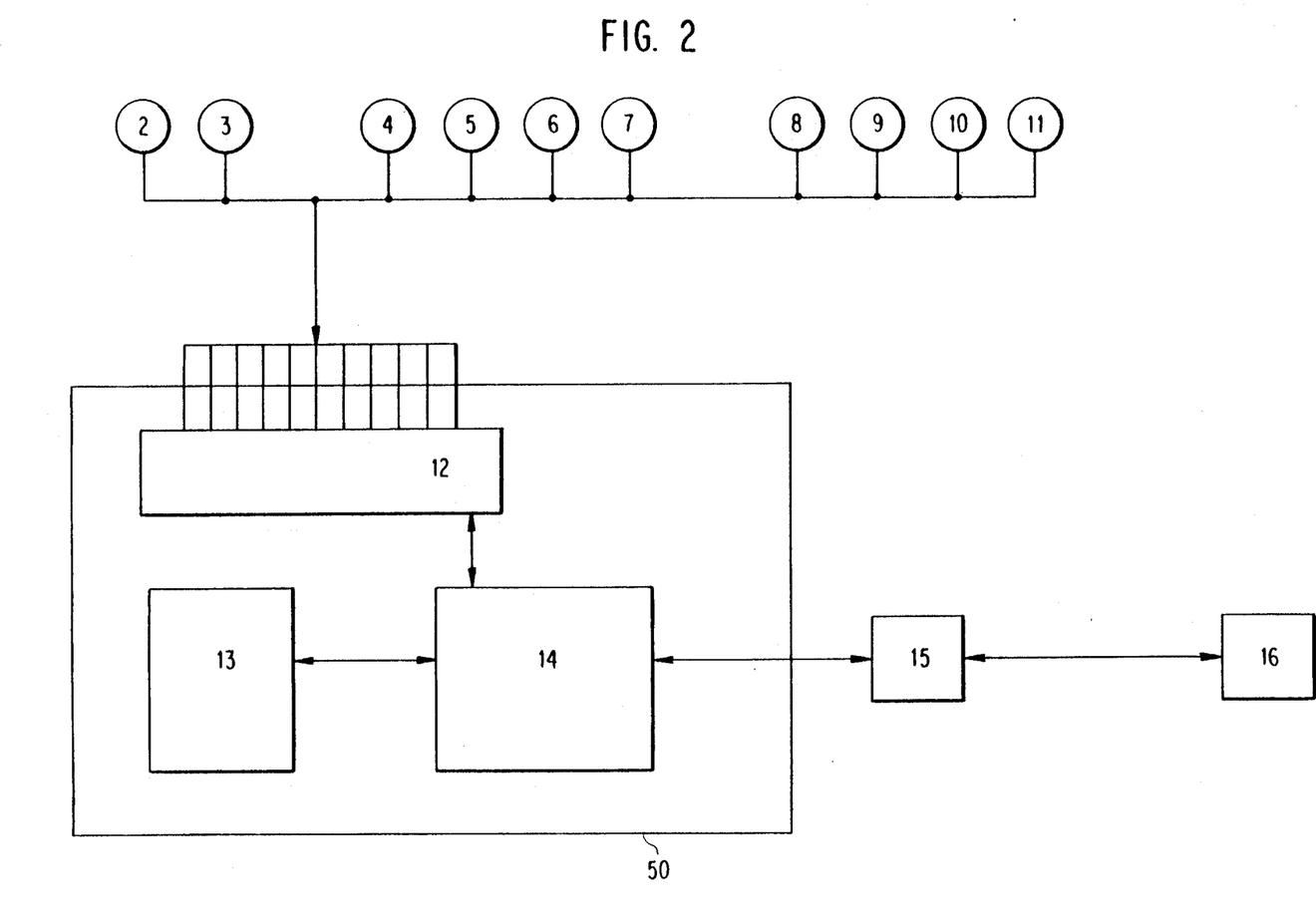
FIG. 2 shows a block diagram of a preferred embodiment of the present invention.

Turning now to FIG. 2, a monitor unit 50 is shown which includes within its housing an input signal processor 12, a memory 13, and a data processor 14. The data processor 14 is further connected to a keyboard/LED panel (display unit) 15. Optionally, the monitor unit 50 may be connected to a computer 16. The temperature sensors 4–7, pressure sensors 8–11, and load sensors 2,3 connect directly to the input signal processor 12, which has an input (i.e., at least ten total inputs) for each of the respective sensor outputs. The analog outputs of each of the identified sensor outputs are converted to digital signals and made available to the data processor 14 for further processing.

The memory 13 is of a non-volatile type (e.g., electrically erasable programmable read-only memory (EEPROM)) used primarily for storing predetermined constant data. However, the memory 13 usage is not so limited and can also function as a work space for the data processor 14.

As used herein, the term "actual" refers to a determination, calculation, etc., which is based on measured inputs of at least one of the sensors 2-11. The term "design" refers to the design specifications established by a manufacturer of a particular chiller model. For example, the actual condenser water entering temperature refers to the water temperature entering the condenser as measured by the temperature sensor 8. On the other hand, the design condenser water entering temperature refers to the temperature of the water entering the condenser per the design specification according to the manufacturer of the particular chiller model currently being analyzed.

With respect to the equations to be described herein, each is numbered (within parenthesis to the right of each equation) according to the order in which the data processor unit 14 actually preforms the calculation. However, the equations are discussed in a different order for clarity of description.

The data processor 14 is pre-programmed to continuously measure and monitor in real-time the chiller efficiency (CE) based upon the sensor inputs, and further to provide a chiller efficiency analysis. The chiller efficiency (CE) is a function of the actual (i.e., based upon the measured sensor inputs) kilowatt usage per evaporator ton (AKWET) divided by the corrected design (i.e., according to a manufacturer's design specifications) kilowatt usage per evaporator ton (CDKWET). In addition, the data processor 14 is programmed to measure and monitor other critical parameters such as the condenser tonnage (ACT), percent heat balance (PHB) and motor tons (MT). The computed measurements along with other critical parameters will be continuously displayed and/or, if desired, applied to other output devices, such as a printer. The method and apparatus as herein disclosed enables the operator to monitor th operating conditions of the chiller unit. The operator is then able to make recommendations on how to increase the chiller's efficiency. Before the chiller efficiency (CE) can be measured, however, intermediate measurements and calculations are performed which will now be described in detail.

First, the actual condenser tonnage (ACT) and actual chiller (evaporator) tonnage (AET) are computed. To make this computation, the data processor 14 detects the temperature and pressure of the condenser water flowing in and out of the condenser 21 and of the chilled water flowing in and out of the chiller 22. These detections are determined by the data processor 14 by reading the sensors 4-11 via the input signal processor 12 and storing each value in memory 13. The actual flow rate of the condenser water (ACFR) and chilled water (AEFR), which is a function of the pressure differential between the inlet and outlet of the condenser unit 21 or chiller unit 22, is calculated. Then, the condenser tonnage (ACT) and chiller (evaporator) tonnage (AET) are computed by the data processor 14 according to the following expressions:

Actual Condenser Water Temperature differential (AC$\Delta$T)

$$AC\Delta T = T_{cl} - T_{ce} \tag{1}$$

Actual Condenser Water Flow Rate (ACFR)

$$ACFR = \sqrt{\frac{(P_{ce} - P_{cl})}{DC\Delta P}} \times DCFR \tag{2}$$

Actual Condenser Tonnage (ACT)

$$ACT = [AC\Delta t \times ACFR]/c_1 \tag{3}$$

Percent Condenser Load (PLC)

$$PLC = ACT / DCT \tag{4}$$

Actual Chilled Water Temperature Differential (AE$\Delta$T)

$$AE\Delta T = T_{ee} - T_{el} \tag{5}$$

Actual Chilled Water Flow Rate (AEFR)

$$AEFR = \sqrt{\frac{(P_{ee} - P_{el})}{DE\Delta P}} \times DEFR \tag{6}$$

Actual Evaporator Tonnage (AET)

$$AET = [AE\Delta T \times AEFR]/c_1 \tag{7}$$

Percent Evaporator Load (PLE)

$$PLE = AET / DET \tag{8}$$

wherein:
$T_{cl}$: temperature of the condenser water leaving sensed by temperature sensor 9;
$T_{ce}$: temperature of the condenser water entering sensed by temperature sensor 8;
$T_{el}$: temperature of the chilled water leaving sensed by temperature sensor 10;
$T_{ee}$: temperature of the chilled water entering sensed by temperature sensor 11;
$P_{cl}$: pressure of the condenser water leaving sensed by pressure sensor 5;
$P_{ce}$: pressure of the condenser water entering sensed by pressure sensor 4;
$P_{el}$: pressure of the chilled water leaving sensed by pressure sensor 6;
$P_{ee}$: pressure of the chilled water entering sensed by pressure sensor 7; P0 DC$\Delta$P: a constant representing the design pressure differential of the condenser water flowing in and out of the condenser;
DCFR: a constant representing the design condenser water flow rate;
DCT: a constant representing the design condenser tonnage;
DE$\Delta$P: a constant representing the design pressure differential of the chilled water flowing in and out of the condenser;
DEFR: a constant representing the design chilled water flow rate;
DET: a constant representing the design evaporator tonnage; and
$c_1$: a constant representing the specific heat of water.

Although the actual condenser tonnage (ACT) does not directly affect the calculation of the chiller efficiency in and of itself, it is considered an important critical parameter and therefore is monitored. That is, an unusually high or low computed value for the actual condenser tonnage (ACT) can alert the operator to a potential problem occurring within the condenser unit.

Next, the actual Amps (AA) that the compressor is drawing from the compressor motor is detected by reading the load sensors 2 and 3 via the input signal processor 12. The value for the actual Amps (AA) used by the data processor 14 is based on an average of these two readings, which can be expressed as:

Actual Amps (AA)

$$AA = [I_1 + I_2]/2 \quad (9)$$

where:
$I_1$: current drawn by a first phase of the motor sensed by load sensor 2; and
$I_2$: current drawn by a second phase of the motor sensed by load sensor 3.

A percentage of the machine load (PML) (i.e., the actual Amps (AA) divided by the design Amps (DA)), is also calculated as follows:

Percent Machine Load (PML)

$$PML = [AA/DA] \times 100 \quad (10)$$

Although, the percent machine load (PML) is not directly needed to calculate the chiller efficiency, it to can alert the operator of problems or potential problems.

With the foregoing determinations, that is, the computed evaporator tonnage (AET) and the actual Amps (AA), the actual Amps per evaporator ton (AAET) and the actual kilowatt usage per evaporator ton (AKWET) are calculated in accordance with the following expressions:

Actual Amps per Evaporator Ton (AAET)

$$AAET = AA/AET \quad (13)$$

Actual Kilowatt per Evaporator Ton (AKWET)

$$AKWET = [AAET \times AMV \times 1.73 \times Pf]/1000 \quad (15)$$

where:
Pf: a constant representing a power factor which typically is set to a value of approximately 0.89;
1.73: a constant equal to the square root of three; and constant representing the actual average of the
AMV: a constant representing the actual average of the motor voltages, this constant is manually measured a number of times.

Once the actual kilowatt usage per evaporator ton (AKWET) is determined, the design kilowatt usage per evaporator ton (DKWET) is calculated. First, however, the design Amps (DA) is corrected to take into account variation, if any, between the design motor voltage (DMV) and the actual motor voltage (AMV) according to the following expression:

Corrected Design Amps (CDA)

$$CDA = [DMV \times DA]/AMV \quad (11)$$

Then, a design amps per evaporator ton (DAET) and design kilowatt usage per evaporator ton (DKWET) are determined in accordance with the following expressions:

Design Amps per Evaporator Ton (DAET)

$$DAET = CDA/DET \quad (12)$$

Design Kilowatt per Evaporator Ton (DKWET)

$$DKWET = [DAET \times AMV \times 1.73 \times Pf]/1000 \quad (14)$$

where: DET: a constant representing the design evaporator tonnage.

In general, equipment manufacturers specify that for every degree the condenser water entering temperature ($T_{ce}$) is lowered and for every degree the chilled water leaving temperature ($T_{el}$) is raised, the chiller should operate approximately 1.5% more efficiently for each degree of deviation. Thus, a design deviation efficiency correction factor (Cf) is calculated based upon the temperature readings of the temperature sensors 4-7 in the follow manner:

Condenser Water Temperature Deviation ($\Delta T_c$)

$$\Delta T_c = T_{Dce} - T_{ce} \quad (16)$$

Chilled Water Temperature Deviation ($\Delta T_e$)

$$\Delta T_e = T_{Del} - T_{el} \quad (17)$$

Total Temperature Deviation (TTD)

$$TTD = \Delta T_c + \Delta T_3 \quad (18)$$

Correction Factor (Cf)

$$Cf = TTD \times 1.5 \quad (19)$$

where:
$T_{Dce}$: a constant representing the design condenser water entering temperature; and
$T_{Del}$: a constant representing the design chilled water leaving temperature.

The design kilowatt usage per evaporator ton (DKWET) is then corrected in accordance with the following formula, taking into consideration the correction factor (Cf) thus obtained to compute a corrected design kilowatt usage per evaporator ton (CDKWET):

Kilowatt Usage Per Evaporator Ton Correction (KWETC)

$$KWETC = DKWET \times Cf \quad (20)$$

Corrected Design Kilowatt Usage Per Evaporator Ton (CDKWET)

$$CDEKWT = DKWET - KWETC \quad (21)$$

After the corrected design kilowatt usage per evaporator ton (CDKWET) (eq. 21) and actual kilowatt usage per evaporator ton (AKWET) (eq. 15) have been computed, the chiller efficiency (CE) and inefficiency (CI) are computed as follows:

Chiller Efficiency (CE)

$$CE = CDKWET/AKWET \quad (22)$$

Chiller Inefficiency (CI)

$$CI = 100 - CE \quad (23)$$

As an additional measurement, the percent heat balance (PHB), which is the relationship of "balance" in the amount of heat rejected by the evaporator and compressor motor with respect to the amount of heat rejected by the condenser, is determined Typically, as an indication that the evaporator and condenser are doing the same amount of work, the percent heat balance (PHB) should be approximately ±7.5%. The percentage heat balance (PHB) is determined as follows:

Motor Tons (MT)

$$MT = AKWET \times AET \times c_2 \quad (24)$$

Percent Heat Balance (PHB)

$$PHB = [MT + AET - ACT] / [MT + AET] \quad (25)$$

where: $c_2$: a constant.

In the course of performing the above measurements and calculations, the data processor 14 also communicates to the display unit 15 certain key parameters, which are then displayed as they are computed. The displayed results provide the operator, in real-time, a means of monitoring the chiller's performance. With respect to this preferred embodiment, the condenser water entering and leaving temperatures, condenser water entering and leaving pressures, evaporator water entering and leaving temperatures, evaporator water entering and leaving pressures, compressor motor amperes and chiller efficiency are sequentially and continuously displayed.

In addition, these parameters and others can be transmitted to the computer 16 for further data processing and for producing a hard copy of any of the critical parameters or results of the intermediate calculations. For example, Table I illustrates a typical hard copy report providing an operator with a complete chiller efficiency analysis. The chiller efficiency analysis report can also be transmitted to the computer multiple times over a predetermined time period, stored on a permanent storage device, and later reviewed by an operator.

TABLE I

| ITEM | DESIGN | ACTUAL |
|---|---|---|
| CONDENSER WATER ENTERING TEMP: | 85 | 80.7 |
| CONDENSER WATER LEAVING TEMP: | 94.5 | 85.8 |
| CONDENSER WATER DELTA T: | 9.5 | 5.1 |
| CONDENSER WATER DROP IN PRESSURE: | 8.27 | 11.1 |
| CONDENSER WATER GALLONS PER MINUTE: | 3000 | 3476 |
| CONDENSER TONS: | 1187 | 739 |
| CONDENSER PERCENT LOAD: | 100% | 62% |
| CHILLED WATER ENTERING TEMP: | 54 | 48.2 |
| CHILLED WATER LEAVING TEMP: | 44 | 43.1 |
| EVAPORATOR DELTA T: | 10 | 5.1 |
| EVAPORATOR DROP IN PRESSURE | 11.43 | 12.8 |
| EVAPORATOR GALLONS PER MINUTE: | 2400 | 2540 |
| EVAPORATOR TONS: | 1000 | 540 |
| EVAPORATOR PERCENT LOAD: | 100% | 54% |
| MOTOR AMPS: | 924 | 546 |
| MOTOR PERCENT LOAD: | 100% | 59% |
| MOTOR VOLTS: | 480 | 480 |
| AMPS PER TON: | .924 | 1.01 |
| KW PER TON: | .68 | 0.75 |
| CONDENSER WATER ENTERING TEMPERATURE DEVIATION: | | 4.3 |
| CHILLED WATER LEAVING TEMPERATURE DEVIATION: | | −0.9 |
| TOTAL TEMPERATURE DEVIATION: | | 3.4 |
| TEMPERATURE DEVIATION CORRECTION PERCENTAGE: | | 0.051 |
| CORRECTED DESIGN KW/TON: | | 0.645 |
| MOTOR TONS: | | 115 |
| PERCENT HEAT BALANCE: | | −0.129 |
| ACTUAL CHILLER EFFICIENCY: | 86% | |

There has thus been shown and described a noval apparatus and method for measuring and monitoring critical parameters of a centrifugal chiller which fulfills all the objects and advantages sought therefor. Many changes, modifications, variations and other uses and applications of the subject invention will, however, become apparent to those skilled in the art after considering the specification and the accompanying drawings which disclose preferred embodiments thereof. All such changes, modifications, variations and other uses and applications which do not depart from the spirit and scope of the invention are deemed to be covered by the invention which is limited only by the claims which follow.

What is claimed is:

1. An apparatus for measuring and monitoring critical parameters including at least an operating efficiency of a chiller unit of the type having a compressor, a condenser, an evaporator, and a motor for driving said compressor, said condenser having an inlet line for receiving a supply of condenser water and an outlet line for discharging said supply of condenser water, said evaporator having an inlet line for receiving a supply of chilled water and an outlet line for discharging said supply of chilled water, comprising:

first and second temperature sensors respectively disposed at said inlet and said outlet of said condenser for detecting and outputting condenser water entering and leaving temperatures ($T_{ce}$) and ($T_{cl}$);

third and fourth temperature sensors respectively disposed at said inlet and outlet of said evaporator for detecting and outputting chilled water entering and leaving temperatures ($T_{ee}$) and ($T_{el}$);

first and second pressure sensors respectively disposed at said inlet and outlet of said condenser for detecting and outputting condenser water entering and leaving pressures ($P_{ce}$) and ($P_{cl}$);

third and fourth pressure sensors respectively disposed at said inlet and outlet of said evaporator for detecting and outputting chilled water entering and leaving pressures ($P_{ee}$) and ($P_{el}$):

load sensor means for detecting and outputting a load of said motor;

storage means for storing predetermined constant data;

data processing means receiving said outputs of said first, second, third and fourth temperature sensors, said first, second, third and fourth pressure sensors, and said load sensor means for calculating at least the efficiency of said chiller in accordance with said outputs of said first, second, third and fourth temperature sensors, said first, second, third and fourth pressure sensors, and said load sensor means and said predetermined constant data; and display means for displaying at least the chiller operating efficiency, the condenser water entering and leaving temperatures, the chilled water entering and leaving temperatures, the condenser water entering and leaving pressures, the chilled water entering and leaving pressures, and compressor motor amperes.

2. The apparatus as claimed in claim 1, wherein said data processor calculates said operating efficiency of said chiller in accordance with the following formulae:

Actual Chilled Water Temperature Differential (AEΔT)

$$AE\Delta T = T_{ee} - T_{el}$$

Actual Chilled Water Flow Rate (AEFR)

$$AEFR = \sqrt{\frac{(P_{ee} - P_{el})}{DE\Delta P}} \times DEFR$$

Actual Evaporator Tonnage (AET)

$$AET = [AE\Delta T \times AEFR]/c_1$$

Corrected Design Amps (CDA)

$$CDA = [DMV \times DA]/AMV$$

Design Amps per Evaporator Ton (DAET)

$$DAET = CDA / DET$$

Actual Amps per Evaporator Ton (AAET)

$$AAET = AA / AET$$

Design Kilowatt per Evaporator Ton (DKWET)

$$DKWET = [DAET \times AMV \times 1.73 \times Pf]/1000$$

Actual Kilowatt per Evaporator Ton (AKWET)

$$AKWET = [AAET \times AMV \times 1.73 \times pf]/1000$$

Condenser Water Temperature Deviation (ΔT)
Ti $\Delta T_c = T_{Dce} - T_{ce}$

Chilled Water Temperature Deviation ($\Delta T_e$)

$$\Delta T_e = T_{Del} - T_{el}$$

Total Temperature Deviation (TTD)

$$TTD = \Delta T_c + \Delta T_e$$

Correction Factor (Cf)

$$Cf = TTD \times 1.5$$

Kilowatt Usage Per Evaporator Ton Correction (KWETC)

$$KWETC = DKWET \times Cf$$

Corrected Design Kilowatt Usage Per Evaporator Ton (CDKWET)

$$CDEKWT = DKWET - KWETC$$

Chiller Efficiency (CE)

$$CE = CDKWET / AKWET$$

wherein:

DEΔP: a constant representing a design pressure differential of the chilled water flowing in and out of the condenser;

DEFR: a constant representing a design chilled water flow rate;

DET: a constant representing a design evaporator tonnage;

$c_1$: a constant representing the specific heat of water;

Pf: a constant representing a power factor which typically is set to a value of approximately 0.89;

1.73: a constant equal to the square root of three;

AMV: a constant representing an actual average of the motor voltages;

DMV: a constant representing a design motor voltage;

AA: a measured value representing current drawn by the motor in terms of amperes;

DA: a constant representing a design amps;

DET: a constant representing a design evaporator tonnage;

$T_{Dce}$: a constant representing a design condenser water entering temperature; and $T_{Del}$: a constant representing a design chilled water leaving temperature.

3. The apparatus as claimed in claim 1, wherein said data processor further calculates an actual condenser tonnage (ACT) in accordance with the following formulae:

Temperature differential (ACΔT)

$$AC\Delta T = T_{cl} - T_{ce}$$

Actual Condenser Water Flow Rate (ACFR)

$$ACFR = \sqrt{\frac{(P_{ce} - P_{cl})}{DC\Delta P}} \times DCFR$$

Actual Condenser Tonnage (ACT)

$$ACT = [AC\Delta t \times ACFR]/c_1$$

wherein

DCΔP: a constant representing a design pressure differential of condenser water flowing in and out of the condenser;

DCFR: a constant representing a design condenser water flow rate;

DCT: a constant representing a design condenser tonnage; and $c_1$: a constant representing the specific heat of water.

4. The apparatus as claimed in claim 1, wherein said data processor further calculates an actual percent heat balance (PHB) in accordance with the following formulae:

Actual Condenser Water Temperature differential (ACΔT)

$AC\Delta T = T_{cl} - T_{ce}$

Actual Condenser Water Flow Rate (ACFR)

$$ACFR = \sqrt{\frac{(P_{ce} - P_{cl})}{DC\Delta P}} \times DCFR$$

Actual Condenser Tonnage (ACT)

$$ACT = [AC\Delta t \times ACFR] / c_1$$

Actual Chilled Water Temperature Differential (AE$\Delta$T)

$$AE\Delta T = T_{ee}T_{el}$$

Actual Chilled Water Flow Rate (AEFR)

$$AEFR = \sqrt{\frac{(P_{ee} - P_{el})}{DE\Delta P}} \times DEFR$$

Actual Evaporator Tonnage (AET)

$$AET = [AE\Delta T \times AEFR] / c_1$$

Actual Amps per Evaporator Ton (AAET)

$$AAET = AA / AET$$

Actual Kilowatt per Evaporator Ton (AKWET)

$$AKWET = [AAET \times AMV \times 1.73 \times Pf] / 1000$$

Motor Tons (MT)

$$MT = AKWET \times AET \times c_2$$

Percent Heat Balance (PHB)

$$PHB = [MT + AET - ACT] / [MT + AET]$$

where:
DC$\Delta$P: a constant representing a design pressure differential of condenser water flowing in and out of the condenser;
DCFR: a constant representing a design condenser water flow rate;
DCT: a constant representing a design condenser tonnage;
DE$\Delta$P: a constant representing a design pressure differential of the chilled water flowing in and out of the condenser;
DEFR: a constant representing a design chilled water flow rate;
DET: a constant representing a design evaporator tonnage;
$c_1$: a constant representing the specific heat of water;
$c_2$: a constant;
Pf a constant representing a power factor which typically is set to a value of approximately 0.89;
1.73: a constant equal to the square root of three;
AA: a measured value representing current drawn by the motor in terms of amperes; and
AMV: a constant representing an actual average of the motor voltages, manually measured a number of times.

5. A method for measuring and monitoring at least an operating efficiency of a chiller unit of the type having a compressor, a condenser, an evaporator, a motor for driving said compressor, said condenser having an inlet line for receiving a supply of condenser water and an outlet line for discharging said supply of condenser water, said evaporator having an inlet line for receiving a supply of chilled water and an outlet line for discharging said supply of chilled water, comprising the steps of:
(a) sensing pressures of said supply of chilled water entering and leaving said evaporator and determining a pressure difference;
(b) calculating an actual flow rate of said chilled water in accordance with said pressure difference and predetermined constant data;
(c) sensing temperatures of said supply of chilled water entering and leaving said evaporator and determining a temperature difference;
(d) sensing a load of said motor;
(e) calculating the efficiency of said chiller in accordance with said actual flow rate, said temperature difference, said load and said predetermined constant data;
(f) displaying said chiller efficiency result; and
(g) repeating said steps (a)-(f).

6. A method for measuring and monitoring at least an operating efficiency of a chiller unit of the type having a compressor, a condenser, an evaporator, a motor for driving said compressor, said condenser having an inlet line for receiving a supply of condenser water and an outlet line for discharging said supply of condenser water, said evaporator having an inlet line for receiving a supply of chilled water and an outlet line for discharging said supply of chilled water, comprising the steps of:
(a) sensing pressures of said supply of chilled water entering and leaving said evaporator and determining an evaporator pressure difference;
(b) calculating an actual chilled water flow rate in accordance with said pressure difference and predetermined constant data;
(c) sensing temperatures of said supply of chilled water entering and leaving said evaporator and determining an evaporator temperature difference;
(d) sensing a load of said motor;
(e) calculating an actual kilowatt usage per evaporator ton in accordance with said actual chilled water flow rate, said evaporator temperature difference, said load and predetermined constant data;
(f) sensing temperatures of said supply of condenser water entering and leaving said condenser and determining a condenser temperature difference;
(g) calculating a corrected design kilowatt usage per evaporator ton in accordance with said evaporator temperature difference, said condenser temperature difference, said load said predetermined constant data;
(h) calculating the operating efficiency of said chiller by dividing said corrected design kilowatt usage per evaporator ton by said actual kilowatt usage per evaporator ton;
(i) displaying said chiller operating efficiency; and
(j) repeating said steps (a)-(i).

7. The method as claimed in claim 6, wherein said actual chilled water flow rate (AEFR) is calculated in accordance with the following formula:
Actual Chilled Water Flow Rate (AEFR)

$$AEFR = \sqrt{\frac{(P_{ee} - P_{el})}{DE\Delta P}} \times DEFR$$

where:

$P_{el}$: pressure of the chilled water leaving said evaporator;

$P_{ee}$: pressure of the chilled water entering said evaporator;

$DE\Delta P$: a predetermined constant representing a design pressure differential of the chilled water flowing in and out of the evaporator; and $DEFR$: a predetermined constant representing a design chilled water flow rate.

8. The method as claimed in claim 6, wherein said actual kilowatt usage per evaporator ton (AKWET) is calculated in accordance with the following formula:

Actual Chilled Water Temperature Differential (AE$\Delta$T)

$$AE\Delta T = T_{ee} - T_{el}$$

Actual Chilled Water Flow Rate (AEFR)

$$AEFR = \sqrt{\frac{(P_{ee} - P_{el})}{DE\Delta P}} \times DEFR$$

Actual Evaporator Tonnage (AET)

$$AET = [AE\Delta T \times AEFR] / c_1$$

Actual Amps per Evaporator Ton (AAET)

$$AAET = AA / AET$$

Actual Kilowatt Usage per Evaporator Ton (AKWET)

$$AKWET = [AAET \times AMV \times 1.73 \times Pf] / 1000$$

where:

$T_{cl}$: temperature of the condenser water leaving said condenser;

$T_{ce}$: temperature of the condenser water entering said condenser;

$T_{el}$: temperature of the chilled water leaving said evaporator;

$T_{ee}$: temperature of the chilled water entering said evaporator;

$P_{cl}$: pressure of the condenser water leaving said condenser;

$P_{ce}$: pressure of the condenser water entering said condenser;

$P_{el}$: pressure of the chilled water leaving said evaporator;

$P_{ee}$: pressure of the chilled water entering said evaporator;

$DE\Delta P$: a predetermined constant representing a design pressure differential of the chilled water flowing in and out of the condenser;

$DEFR$: a predetermined constant representing a design chilled water flow rate;

$DET$: a predetermined constant representing a design evaporator tonnage;

$c_1$: a predetermined constant representing the specific heat of water;

$Pf$: a predetermined constant representing a power factor which typically is set to a value of approximately 0.89;

1.73: a constant equal to the square root of three;

$AA$: a measured value representing current drawn by the motor in terms of amperes; and $AMV$: a predetermined constant representing an actual average of motor voltages.

9. The method as claimed in claim 6, wherein said corrected design kilowatt usage per evaporator ton (CDKWET) being calculated in accordance with the following formulae:

Corrected Design Amps (CDA)

$$CDA = [DMV \times DA] / AMV$$

Design Amps per Evaporator Ton (DAET)

$$DAET = CDA / DET$$

Design Kilowatt per Evaporator Ton (DKWET)

$$DKWET = [DAET \times AMV \times 1.73 \times Pf] / 1000$$

Condenser Water Temperature Deviation ($\Delta T_c$)

$$\Delta T_c = T_{Dce} - T_{ce}$$

Chilled Water Temperature Deviation ($\Delta T_e$)

Total Temperature Deviation (TTD)

$$TTD = \Delta T_c + \Delta T_e$$

Correction Factor (Cf)

$$Cf = TTD \times 1.5$$

Kilowatt Usage Per Evaporator Ton Correction (KWETC)

$$KWETC = DKWET \times Cf$$

Corrected Design Kilowatt Usage Per Evaporator Ton (CDKWET)

$$CDEKWT = DKWET - KWETC$$

where:

$T_{ce}$: temperature of the condenser water entering said condenser;

$T_{el}$: temperature of the chilled water leaving said evaporator;

$T_{Dce}$: a constant representing a design condenser water entering temperature;

$T_{Del}$: constant representing a design chilled water leaving temperature;

$DET$: a constant representing a design evaporator tonnage;

$AMV$: a constant representing an actual average of motor voltages;

$DMV$: a constant representing a design motor voltages;

$DA$: a constant representing a design amps;

$Pf$ a constant representing a power factor which typically is set to a value of approximately 0.89; and 1.73: a predetermined constant representing the square root of three.

10. The method as claimed in claim 6, further comprising the steps of:
   sensing pressures of said supply of condenser water entering and leaving said condenser and determining a pressure difference therebetween;
   calculating an actual condenser water flow rate in accordance with said pressure difference and predetermined constant data;
   calculating an actual condenser tonnage of said condenser in accordance with said actual condenser water flow rate, said condenser temperature difference, said load and said predetermined constant data.

11. The method as claimed in claim 10, further comprising the steps of: calculating a percent heat balance in accordance with the following formulae:

Actual Condenser Water Temperature differential (AC$\Delta$T)

$$AC\Delta T = T_{cl} - T_{ce}$$

Actual Condenser Water Flow Rate (ACFR)

$$ACFR = \sqrt{\frac{(P_{ce} - P_{cl})}{DC\Delta P}} \times DCFR$$

Actual Condenser Tonnage (ACT)

$$ACT = [AC\Delta t \times ACFR]/c_1$$

Actual Chilled Water Temperature Differential (AE$\Delta$T)

$$AE\Delta T = T_{ee} - T_{el}$$

Actual Chilled Water Flow Rate (AEFR)

$$AEFR = \sqrt{\frac{(P_{ee} - P_{el})}{DE\Delta P}} \times DEFR$$

Actual Evaporator Tonnage (AET)

$$AET = [AE\Delta T \times AEFR]/c_1$$

Actual Amps per Evaporator Ton (AAET)

$$AAET = AA / AET$$

Actual Kilowatt per Evaporator Ton (AKWET)

$$AKWET = [AAET \times AMV \times 1.73 \times Pf]/1000$$

Motor Tons (MT)

$$MT = AKWET \times AET \times c_2$$

Percent Heat Balance (PHB)

$$PHB = [MT + AET - ACT]/[MT + AET]$$

where:
$T_{cl}$: temperature of the condenser water leaving said condenser;
$T_{ce}$: temperature of the condenser water entering said condenser;
$T_{el}$: temperature of the chilled water leaving said evaporator;
$T_{ee}$: temperature of the chilled water entering said evaporator;
$P_{cl}$: pressure of the condenser water leaving said condenser;
$P_{ce}$: pressure of the condenser water entering said condenser;
$P_{el}$: pressure of the chilled water leaving said evaporator;
$P_{ee}$: pressure of the chilled water entering said evaporator;
DC$\Delta$P: a constant representing a design pressure differential of the condenser water flowing in and out of the condenser;
DCFR: a constant representing a design condenser water flow rate;
DCT: a constant representing a design condenser tonnage;
DE$\Delta$P: a constant representing a design pressure differential of the chilled water flowing in and out of the condenser;
DEFR: a constant representing a design chilled water flow rate;
DET: a constant representing a design evaporator tonnage:
Pf: a constant representing a power factor which typically is set to a value of approximately 0.89;
1.73: a constant equal to the square root of three;
AA: a measured value representing current drawn by the motor in terms of amperes;
AMV: a constant representing an actual average of the motor voltage;
$c_1$: a constant representing the specific heat of water; and
$c_2$: a constant.

* * * * *